United States Patent [19]

Kadono et al.

[11] Patent Number: 4,741,745

[45] Date of Patent: May 3, 1988

[54] PROCESS FOR SEPARATION OF CARBON DIOXIDE FROM OTHER GASES

[75] Inventors: Yukio Kadono; Minoru Miyagawa; Takahiko Nakai, all of Yokohama; Minoru Saotome, Ebina, all of Japan

[73] Assignee: Norton Company, Worcester, Mass.

[21] Appl. No.: 43,013

[22] Filed: Apr. 27, 1987

[51] Int. Cl.⁴ .............................................. B01D 47/00
[52] U.S. Cl. ......................................... 55/43; 55/48; 55/68
[58] Field of Search ................... 55/42, 43, 48, 49, 53, 55/68, 73

[56] References Cited

U.S. PATENT DOCUMENTS

| | | | |
|---|---|---|---|
| 2,139,375 | 12/1938 | Millar et al. | 23/2 |
| 2,649,166 | 8/1953 | Porter | 55/42 |
| 3,737,392 | 6/1973 | Ameen et al. | 252/364 |
| 3,824,766 | 7/1974 | Valentine et al. | 55/73 |
| 3,877,893 | 4/1975 | Sweny et al. | 55/48 |
| 3,880,615 | 4/1975 | Grunewald | 55/73 |
| 4,044,100 | 8/1977 | McElroy, Jr. | 423/226 |
| 4,302,220 | 11/1981 | Volkamer et al. | 55/48 |
| 4,330,305 | 5/1982 | Kuessner et al. | 55/53 |
| 4,345,918 | 8/1982 | Meissner | 55/73 |
| 4,414,004 | 11/1983 | Wagner et al. | 55/48 |
| 4,552,572 | 11/1985 | Galstaun | 55/43 |
| 4,581,154 | 4/1986 | Kutsher et al. | 252/170 |

Primary Examiner—Bernard Nozick
Attorney, Agent, or Firm—Frank S. Chow

[57] ABSTRACT

Diisopropyl ethers of oligomers of ethylene glycol having between 2 and 8 ethylene glycol moieties and an average molecular weight between 190 and 300, are more useful physical absorption solvents for the separation of acid gases than are dimethyl, diethyl, ethyl butyl, propyl butyl, dibutyl, or higher alkyl ethers of the same ethylene glycol oligomers, because of a combination of high solution capacity, high separation efficiencies, low viscosity, low gas pressure, and resistance to hydrolysis during use. The diisopropyl ether of diethylene glycol is especially advantageous for use at absorber temperatures below 0° C. Because of low viscosity, the diisopropyl ethers can often be substituted in separation equipment designed for use with chemical rather than physical solvents, thereby realizing the lower operating costs associated with physical solvents without requiring new capital investment.

12 Claims, 1 Drawing Sheet

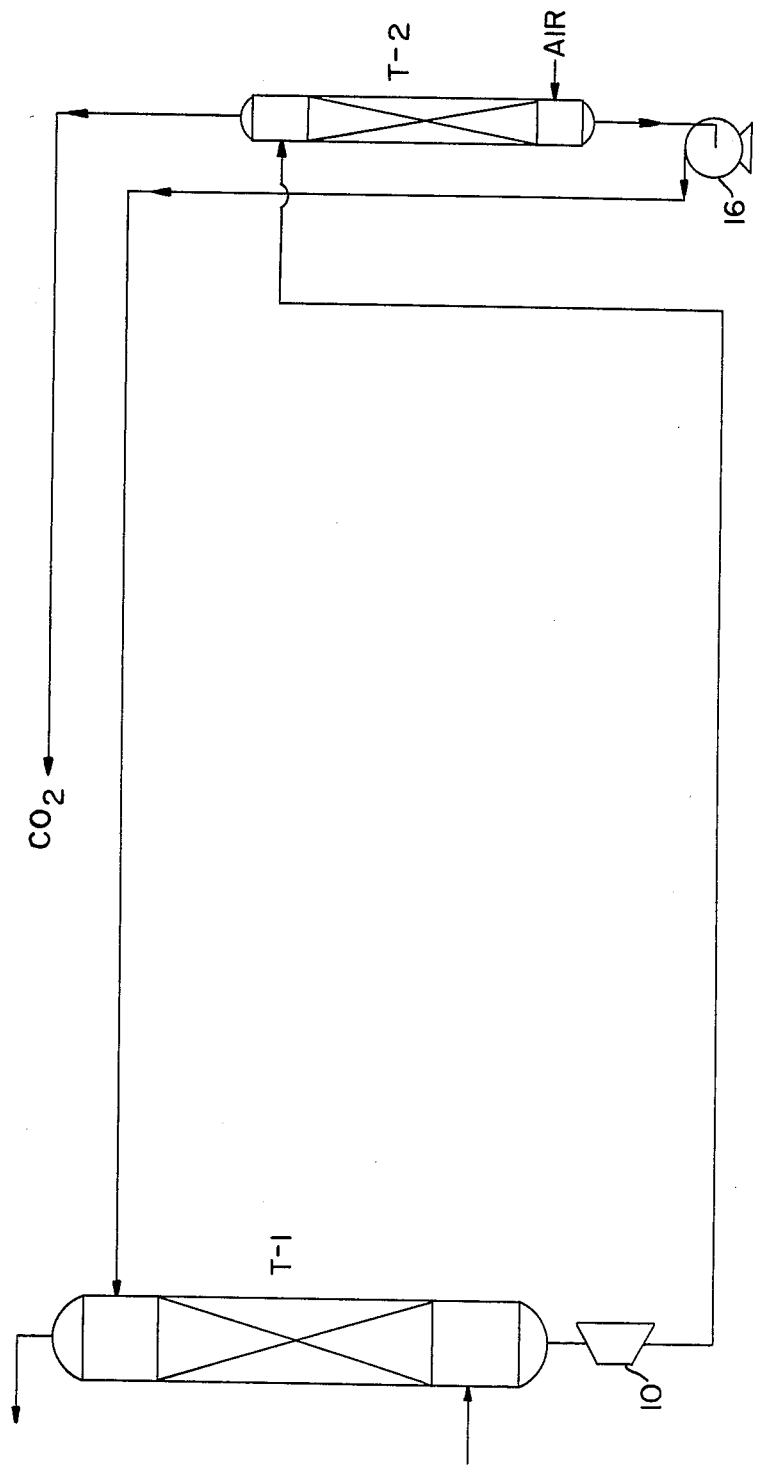

PROCESS FOR SEPARATION OF CARBON DIOXIDE FROM OTHER GASES

TECHNICAL FIELD

This invention relates to the separation of carbon dioxide, from other gases with which it are mixed, by preferential absorption of the carbon dioxide in a solvent to which the gas mixture is exposed under pressure. The carbon dioxide is later desorbed from its solution in the separation solvent by reducing its partial pressure in the gas with which the absorbing solvent is in contact and/or by heating the solvent. More particularly, this invention is concerned with a superior solvent for such separations. It is particularly applicable to the separation of carbon dioxide from natural gas, synthesis gas, and coke oven gas.

TECHNICAL BACKGROUND

The general use of organic solvents as physical absorbents for acid gases is well known in the art, and among the most successful of such solvents are the ethers of oligomers of polyethylene glycol. U.S. Pat. Nos. 3,737,392 of Jun. 5, 1973 to Ameen et al. and 4,581,154 of Apr. 8, 1986 to Kutsher and Valentine describe the use of dimethyl ethers of oligomers with from 2 to 8 ethylene glycol moieties. W. Woelfer, "Helpful Hints for Physical Solvent Absorption", *Hydrocarbon Processing* (November 1982) 193–197, shows the use of methyl iso-propyl ethers of the same oligomers. Japanese Patent Laid-Open No. SHO 49(1974)-98,383 discloses the use of ethers of oligomers with 2–10 ethylene glycol moieties, in which one of the etherifying groups is tertiary butyl and the other may range from methyl to butyl.

U.S. Pat. No. 2,139,375 of Dec. 6, 1938 to Millar et al. disclosed the general use of ethers, esters, and mixed ether-esters of polyhydric alcohols and oligomers of polyhydric alcohols in the removal of sulphur containing acid gases from gas mixtures. A specific reference to the use of the "dipropyl" ethers of diethylene glycol (page 3, left column, line 60) and dipropylene glycol (page 3, left column, line 62) occurs in this patent as part of a long list of suitable materials (page 3, line 9 of the left column to page 4, line 30). This reference, however, does not teach any advantage of "dipropyl" ethers over any of the other many possible solvents listed. In fact, the reference teaches that "of the polyhydric alcohol esters, esters, and mixed ether-esters having the same oxygen groups in their molecules, the ones having in their molecules the smallest number of directly linked atoms devoid of oxygen atoms linked thereto possess the greatest absorptive capacity for acid gases, which capacity progressively decreases as the number of directly linked carbon atoms devoid of oxygen atoms increases." (Page 2, right column, lines 66–75) Thus, according to this teaching, propyl ethers should have less capacity than methyl and ethyl ethers.

U.S. Pat. No. 3,877,893 of Apr. 15, 1975 to Sweny teaches the removal of contaminants, including carbon dioxide, from gas mixtures by a process as described generally herein, but with use of "a dialkyl ether of a polyethylene glycol solvent having 1–8 carbon atoms in each alkyl group and 3–8 ethylene units" (column 10, lines 66–68). Dimethyl ethers of polyethylene glycol are described as the preferred solvents (column 4 lines 32–34), and there is no teaching of an advantage for diisopropyl ethers.

U.S. Pat. No. 4,044,100 of Aug. 23, 1977 to McElroy teaches the use of mixtures of diisopropanolamine and dialkyl ethers of a polyethylene glycol. Again, dimethyl ethers are taught as preferred (column 3 lines 15–16).

An object of the present invention is to provide a superior separation process for the separation of carbon dioxide by use of a previously unused solvent which has higher solution capacity for carbon dioxide than the solvents noted above, combined with adequately low viscosity to permit practical operation at temperatures below the freezing point of water, resistance to deleterious reactions with water often present in practical gas mixtures, and sufficiently low gas pressure to prevent uneconomical processing losses of solvent.

The solvent is preferably used in otherwise conventional separation processes which comprise the steps of (a) contacting a gaseous mixture, containing carbon dioxide and at least one other gas, with the solvent at an absorption pressure; (b) separating the resulting gas phase that is relatively depleted in the acid gas from the enriched solvent containing dissolved carbon dioxide; (c) reducing the gas pressure over the enriched solvent to a desorption pressure lower than the absorption pressure, whereby carbon dioxide passes from the solvent phase into the gas phase; (d) separating the desorbed carbon dioxide from the solvent; and (e) recycling desorbed solvent to extract more carbon dioxide from a new quantity of gas mixture. Alternatively, but generally less preferably because of the higher energy cost of heating and cooling large volumes of solvent, the carbon dioxide could be separated by absorption at a low temperature and expulsion from the solvent at a higher temperature.

An example of a specific process to which the present invention is especially well suited is the removal of carbon dioxide from synthesis gas. In a typical process of this type, synthesis gas is contacted with cold solvent in a $CO_2$ absorber operating at about 27 bars pressure. $CO_2$ is absorbed from the synthesis gas by the solvent flowing down the absorber. Solvent enriched in $CO_2$ is taken from the bottom of the absorber and injected into a flash drum at a lower pressure such as 5–10 bars. This results in elimination of most of the hydrogen, methane, and inert gases from the rich solvent into a gas mixture above the solvent. The flashed gas is removed and subsequently may be compressed and recyclced to another absorber or routed to other uses. The solvent, which after this first flashing still contains most of its originally absorbed content of carbon dioxide, is then flashed to approximately 1 bar pressure in a second flash drum. As a result of this second flashing, about 50–70% of feed $CO_2$ is eliminated from the solvent to gas phase space in the flash drum, from which is it removed and transferred to a $CO_2$ product line.

If the amount of carbon dioxide thereby recovered is adequate for downstream uses for this gas, the solvent may be regenerated in a stripping column. Air is generally used as the stripping medium in a packed tower with countercurrent flow. Spent air, containing some $CO_2$, is then vented to the atmosphere from the top of the column. Stripped solvent, containing little or no $CO_2$, is then recycled to the absorber. The amount of $CO_2$ which is vented with the spent air is lost in this version of the process.

If a higher fraction of the $CO_2$ needs to be recovered for use, solvent after the second flash at about 1 bar may be routed to a vacuum flash drum generally operated at 0.3-0.8 bars, before the solvent is routed to an air stripper. The addition of this third flashing operation can increase the $CO_2$ recovery to as much as 90% of the amount in the feed, if the pressure in the vacuum flash is low enough.

Several modifications of the process described above are within conventional practice. The air stripping column may be replaced by another flash drum into which air is injected cocurrently with the solvent stream. The stripping may be performed under vacuum, thereby substantially reducing the amount of air needed and consequent dilution of the recovered $CO_2$ with air. Stripping may be accomplished with treated synthesis gas instead of air, with the gas stream exiting from the stripper being recycled to the bottom of the absorber. This scheme can result in nearly 100% recovery of the $CO_2$ in the feed.

Physical solvents are known to be energy efficient compared with chemical solvents, and in many instances they have proved to be very attractive economically. In general, however, physical solvents used in the past have had a higher viscosity than chemical solvents. If the viscosity is too high, larger absorber, flash, and stripper vessels are needed. This increases capital requirements and average downtime in practical separation plants.

SUMMARY OF THE INVENTION

It has been found that diisopropyl ethers of ethylene glycol oligomers are superior physical solvents for separating carbon dioxide, and may be substituted for mixed methyl ethers in all processes for separating carbon dioxide from non-acid gases described in U.S. Pat. No. 3,737,392. The diisopropyl ethers of diethylene glycol, triethylene glycol, tetraethylene glycol, and of mixed oligomers chosen to give an average ether molecular weight between 190 and 300 are preferred as having the best combinations of high absorptivity for carbon dioxide at high pressure, combined with a low ratio of solubility at low pressure to solubility at high pressure; low viscosity, especially at low temperature; resistance to hydrolysis; and low gas pressure at common working temperatures. For example, the diisopropyl ether of diethylene glycol has a gas pressure of about 0.1 mm of mercury at 20 C., and the diisopropyl ethers of triethylene glycol and tetraethylene glycol have gas pressures of less than 0.01 mm of mercury at the same temperature.

BRIEF DESCRIPTION OF THE DRAWING

The sole drawing FIGURE shows apparatus in which a process according to this invention can be carried out.

PREFERRED EMBODIMENTS AND MODES OF USING THE INVENTION

The diisopropyl ethers of oligomers of ethylene glycol can be made by well-known methods, such as by the reaction of the oligomers of ethylene glycol with propylene in the presence of a strong acid ion-exchange resin at a temperature between 80 and 150 C. at a pressure of from 100 to 1000 kilopascals (kPa). A general method for the preparation of dialkyl ethers of ethylene glycols from the monoalkyl ethers thereof, with process details, is given in U.S. Pat. No. 3,591,641 of July 6, 1971 to Ameen et al., and other methods of synthesis are described in general terms in previously cited U.S. Pat. No. 3,737,392 and are generally known in the art of organic chemical synthesis.

Table 1 shows the relative solubilities of carbon dioxide at one and six bars pressure in a variety of different, relatively pure, ethers of di-, tri-, and tetra-ethylene glycol, along with certain other physical properties relevant to use of these ethers in separation processes of the type contemplated by this invention. The solubilities shown in Table 1 were measured by the following technique: One hundred grams of the ether was placed in a stainless steel autoclave with an inner volume of 300 ml and deaerated under a vacuum. Then carbon dioxide gas from a weighed pressure cylinder was admitted to the autoclave, with its temperature maintained at 25 C., until the pressure shown by a gauge connected to the gas space of the autoclave rose to the prescribed level. The amount of carbon dioxide gas absorbed was calculated by subtracting the amount of carbon dioxide known to occupy the gas filled space within the autoclave from the mass of carbon dioxide lost from the pressure cylinder during the absorption.

TABLE 1

COMPARISON OF RELEVANT PHYSICAL PROPERTIES OF VARIOUS ETHERS OF ETHYLENE GLYCOL OLIGOMERS

| Ether | Melting Point | Boiling Point* | Viscosity at 25 C., Centipoises | Carbon Dioxide Absorbed at 25 C. Moles/Kg Ether at 6 Bars | Ratio to Amount at 1 Bar |
|---|---|---|---|---|---|
| Ethers of Diethylene glycol | | | | | |
| Dimethyl | −75 C. | 162 | 1.1 | 1.46 | 6.1 |
| Diethyl | −44 | 189 | 1.5 | 1.17 | 5.8 |
| Ethyl n-propyl | −25 | 191 | 1.5 | 1.12 | 5.9 |
| Ethyl isopropyl | −50 | 100/30 | 1.3 | 1.14 | 6.0 |
| Ethyl n-butyl | −25 | 119/30 | 1.6 | 1.04 | 6.1 |
| Ethyl sec-butyl | | 108/25 | 1.4 | 1.07 | 5.9 |
| Ethyl tert-butyl | −70 | 208 | 1.6 | 1.09 | 6.0 |
| Diisopropyl | <−25 | 110/30 | 1.5 | 1.11 | 6.2 |
| Isopropyl n-butyl | | 236 | 1.8 | 1.00 | 6.2 |
| Ethyl cyclohexyl | | 120/8 | 3.8 | 0.74 | 6.2 |
| Ethers of Triethylene Glycol | | | | | |
| Dimethyl | −45 | 216 | 2.3 | 1.14 | 6.0 |
| Diisopropyl | <−25 | 270 | 2.5 | 1.05 | 6.2 |
| Ethers of Tetraethylene Glycol | | | | | |
| Dimethyl | −27 | 275 | 3.6 | 1.07 | 6.3 |
| Diisopropyl | <−15 | 300 | 3.9 | 1.01 | 6.7 |

*The boiling point is at one bar pressure unless the number in this column is followed by a virgule (/); then the boiling point is at a pressure of the number of mm of mercury after the virgule.

Dimethyl, diethyl, and ethyl propyl ethers of diethylene glycol have boiling points too low, with corresponding gas pressures too high, to be of best practical value for repeated use in separations at normal operating temperatures, because of loss of solvent. Ethyl butyl ethers of diethylene glycol have adequately low gas pressures, but do not have as high a solubility for carbon dioxide at six bars as does the diisopropyl ether, while the ethyl butyl ethers have almost as high a solubility for carbon dioxide at one bar. Thus, the separation efficiency for the ethyl butyl ethers is lower than for diisopropyl ether. Higher molecular weight ethers, such as propyl butyl or ethyl cyclohexyl, have lower carbon dioxide solubility, along with higher viscosities.

For the ethers of tri- and tetra-ethylene glycol, the superior separation efficiency of the diisopropyl ethers is retained, compared with dimethyl ethers, at relatively slight sacrifice in slightly higher viscosity. In practice, the higher viscosity is more than compensated for by lower solvent losses due to lower gas pressure.

In past practice, relatively little practical use has been made of pure ethers of a single oligomer of ethylene glycol in separations of the type contemplated by this invention. Instead, mixtures of ethers of oligomers with from 2 to 10 ethylene glycol moieties have been generally preferred. Comparisons of the solvents used in this invention with some of the practical prior art is shown in Table 2. The pure ethers used in the present invention have about the same separation efficiency as the mixtures used in the prior art, but notably greater solution capacity for carbon dioxide.

TABLE 2

COMPARISON OF CARBON DIOXIDE ABSORPTION BY DIISOPROPYL ETHERS OF ETHYLENE GLYCOL OLIGOMERS AND BY VARIOUS OTHER SOLVENTS BELIEVED NOW TO BE USED ON A COMMERCIAL SCALE

| Solvent | Moles of Carbon Dioxide Absorbed per Kilogram of Solvent at 25 C. and Pressure of: | |
|---|---|---|
| | 1 Bar | 6 Bars |
| Diethylene glycol diisopropyl ether | 0.18 | 1.11 |
| Triethylene glycol diisopropyl ether | 0.17 | 1.05 |
| Tetraethylene glycol diisopropyl ether | 0.15 | 1.01 |
| Polyethylene glycol dimethyl ether* | 0.14 | 0.88 |
| Polyethylene glycol methyl isopropyl ether** | 0.15 | 0.92 |
| Polyethylene glycol methyl tertbutyl ether | 0.15 | 0.95 |
| Propylene carbonate | 0.13 | 0.79 |

*Corresponds to SELEXOL solvent sold by Norton Company in 1986.
**Believed to correspond to SEPASOL MPE solvent developed by BASF and described in the Woelfer reference cited herein.

TABLE 3

COMPARATIVE ABSORPTION OF CARBON DIOXIDE BY DEGDiPE AND PEGDME SOLVENTS AT TWO TEMPERATURES

| Mole Fractions of Constituent in Gas Mixture Fed to Absorber | | Temperature, Degrees C. | Solubility in Grams of Solute Gas Per 100 Grams of Solvent | | | |
|---|---|---|---|---|---|---|
| | | | In PEGDME | | In PEGDiPE | |
| $CO_2$ | $H_2$ | | $CO_2$ | $H_2$ | $CO_2$ | $H_2$ |
| 0.133 | 0.867 | −14 | 6.0 | 0.0075 | 7.7 | 0.0115 |
| 0.139 | 0.861 | +2 | 4.0 | 0.0075 | 5.8 | 0.0170 |

The absorption pressure for the data shown in this Table was 28.7 bars.

The absorption pressure for the data shown in this Table was 28.7 bars.

As is generally known, mixtures of at least some proportions of two or more components generally have lower freezing points than any of the pure components in the mixture. Mixtures of diisopropyl ethers may effectively be used in the present invention, along with the three ethers of relatively pure di-, tri-, and tetraethylene glycol, as described above. Such mixtures are especially suitable for use at low temperatures. Suitable mixtures have constituents of the formula $(CH_3)_2CHO-(C_2H_4O)_x-HC(CH_3)_2$, where x may assume any integer value between 2 and 8. Preferably, the mixture has an average molecular weight between 190 and 300.

The solvents preferred for the present invention also are more advantageous than currently used solvents for operation at low temperatures. For example, diisopropyl ether of diethylene glycol (hereinafter sometimes denoted as DEGDiPE) has a viscosity of less than 5 centipoises (cps) at −29 C. and only 3.5 cps at −17 C., whereas dimethyl ethers of mixed polyethylene glycols (hereinafter sometimes denoted as PEGDME), sold by Norton Company under the trade mark SELEXOL, have a viscosity of 35 cps at −17 C. and do not fall below 5 cps in viscosity at any temperature below 26 C. The advantage is further illustrated in Table 3. Because of high viscosity, it is impractical to operate a separation process with PEGDME solvent much below 2 C., whereas a process with the DEGDiPE solvent can readily be operated at −14 C. As a result, almost twice the amount of carbon dioxide can be practically absorbed by the solvent preferred for this invention, compared with SELEXOL.

Because of the relatively low viscosity of the solvents used in the present invention, compared with previously used physical solvents for acid gas separation, physical absorption solvents and processes using these solvents can often be used with existing separation equipment originally designed for use with chemical solvents. In this manner, the present invention combines the lower capital cost of equipment which in the past has characterized the use of chemical solvents with the lower operating cost that has always characterized physical solvents, making the present invention very attractive commercially.

The operation of the process according to this invention can be readily understood with the aid of the drawing FIGURE. T-1 in this FIGURE is a contactor in which a gas containing carbon dioxide, such as synthesis gas, for example, is introduced at the position shown by the lower left arrow leading into T-1. A solvent according to this invention, such as the diisopropyl ether of diethylene glycol, is introduced via the line entering at the upper right of T-1. Pressure and temperature within T-1 are maintained at some values, such as 6 bars and 25 C., which will cause most of the carbon dioxide content of the admitted gas to be absorbed. Gas depleted in carbon dioxide flows off via the line shown at the top center of T-1. The ether solvent, containing dissolved carbon dioxide, is pumped via the line shown exiting the bottom center of T-1, through decompressor 10, to the entry point at the upper left side of T-2, another tower which is maintained at the same temperature but at a lower pressure than T-1, for example, 1 bar. Carbon dioxide collects in the vapor space at the top of T-2, from which it is pumped to a urea plant or other uses via the line exiting the top center of T-2 as shown in the drawing. Ether solvent depleted in carbon dioxide is pumped from the outlet at the bottom center of T-2, through compressor 16, back to the entry point on the upper right side of T-1, to absorb carbon dioxide from additional synthesis gas.

It is to be understood that all examples given herein are non-limiting, and the scope of the invention is defined by the appended claims.

What is claimed is:

1. In a process for the separation of carbon dioxide from an original mixture of carbon dioxide and a non-acid gas, said process comprising the steps of:

(a) contacting the gas mixture with an initial liquid solvent at an absorption pressure sufficient to cause carbon dioxide to dissolve in said solvent in sufficient amount so that the mole fraction of carbon dioxide remaining in the secondary gas phase that remains after absorption at said absorption pressure is smaller than the mole fraction of carbon dioxide in said original mixture, while the mole fraction of carbon dioxide in the secondary solvent that results after absorption is greater than in said initial solvent;

(b) separating said secondary gas phase and said secondary solvent;

(c) exposing said secondary solvent, in a vessel containing a vapor space above said secondary solvent, to a desorption pressure lower than said absorption pressure, whereby carbon dioxide passes from the secondary solvent phase into a tertiary gas phase in said vapor space and a tertiary solvent phase remains liquid;

(d) separating said tertiary gas phase from the tertiary solvent; and (e) recycling tertiary solvent to extract more acid gas from a new quantity of the gas mixture, the improvement wherein said initial solvent consists essentially of a composition having the generic chemical formula: $(CH_3)_2CHO—(C_2H_4O)_x—HC(CH_3)_2$, where x is an integer between 2 and 8.

2. A process according to claim 1, wherein said initial solvent has an average molecular weight between 190 and 300.

3. A process according to claim 2, wherein said initial solvent consists essentially of the diisopropyl ether of diethylene glycol, triethylene glycol, or tetraethylene glycol.

4. A process according to claim 3, wherein the temperature at which step (a) occurs is about 25 C., the absorption pressure is about six bars, and the desorption pressure is about one bar.

5. A process according to claim 3, wherein the viscosity of said initial solvent at 25 C. is not more than 1.6 centipoises.

6. A process according to claim 2, wherein the temperature at which step (a) occurs is below 0 C.

7. A process according to claim 6, wherein said non-acid gas consists essentially of hydrogen, said initial solvent is the diisopropyl ether of diethylene glycol, the temperature at which step (a) occurs is below −10 C., and the absorption pressure is about 30 bars.

8. In a process for the separation of an initial mixture of carbon dioxide with a non-acid gas, said process comprising the steps of:

(a) contacting the initial gas mixture with an initial liquid solvent at an absorption temperature at a pressure sufficient to cause carbon dioxide to dissolve in said solvent in sufficient amount so that the mole fraction of carbon dioxide present in the secondary gas phase that remains after absorption at said absorption temperature and pressure is smaller than the mole fraction of carbon dioxide in said original mixture, while the mole fraction of carbon dioxide in the secondary solvent that results after absorption is greater than in said initial solvent;

(b) separating said secondary gas phase and said secondary solvent;

(c) exposing said secondary solvent, in a vessel containing a vapor space above said secondary solvent to an appropriate pressure and a desorption temperature higher than said absorption temperature, whereby carbon dioxide passes from the secondary solvent phase into a tertiary gas phase in said vapor space and a tertiary solvent phase remains liquid;

(d) separating said tertiary gas phase from the tertiary solvent; and (e) recycling tertiary solvent to extract more acid gas from a new quantity of the gas mixture, the improvement wherein said initial solvent consists essentially of a composition having the generic chemical formula $(CH_3)_2CHO—(C_2H_4O)_x—HC(CH_3)_2$, where x is an integer between 2 and 8.

9. In a process for the separation of carbon dioxide from synthesis gas, comprising the steps of:

(a) introducing synthesis gas into a counter current flow absorber column and introducing a solvent into the same absorber column at a point above the point of introduction of the synthesis gas;

(b) causing counter current flow of said solvent and said synthesis gas within said absorber column while maintaining the pressure within said column at a specified absorption pressure, whereby said carbon dioxide, along with any hydrogen, methane, and inert gases present, is absorbed from said synthesis gas into said solvent to produce enriched solvent at the absorption pressure;

(c) transferring said enriched solvent into a first flash drum maintained at a first flash pressure that is lower than said absorption pressure, whereby most of any hydrogen, methane, and inert gases present in said enriched solvent is released to a gas phase space within said first flash drum, while most of the carbon dioxide content of said enriched solvent is maintained in solution, to produce first flashed solvent;

(d) transferring said first flashed solvent into a second flash drum maintained at a second flash pressure that is lower than said first flash pressure, whereby at least 50% of the carbon dioxide content of said first flashed solvent is released into a gas space maintained within said second flash drum, to produce second flashed solvent;

(e) stripping said second flashed solvent of substantially all its remaining carbon dioxide content to produced stripped solvent; and (f) recycling said stripped solvent to said absorber column, the improvement wherein said solvent consists essentially of molecules having the generic chemical formula $(CH_3)_2CHO—(C_2H_4O)_x—HC(CH_3)_2$, where x is an integer between 2 and 8.

10. A process according to claim 9, wherein said solvent has an average molecular weight between 190 and 300.

11. A process according to claim 10, wherein the temperature at which step (a) occurs is below 0 C.

12. A process according to claim 11, wherein said solvent has a viscosity of less than 5 cps at the temperature at which step (a) occurs.

* * * * *